Patented Feb. 15, 1927.

1,618,149

UNITED STATES PATENT OFFICE.

CHARLES B. DAVIS, OF NEW YORK, N. Y.

ABSORBENT DECOLORIZING MEDIUM.

No Drawing.   Application filed December 14, 1923. Serial No. 680,690.

My new absorbent decolorizing medium is available not only for the purification and decolorizing of sugar liquors, lactic acid, glycerine, aspirin, oils, etc.; in the various arts, but is also adaptable for other and analogous uses, as, for instance, the absorption and adsorption of gases from air, so that I do not limit the scope of my invention in this respect,—the essential feature thereof consisting in the charging or sur-charging of the capillaries of a porous base with oxygen in such manner as to form an integral unitary compound having a maximum affinity capacity for deleterious gases or matter in solution, all as hereinafter fully set forth.

As a convenient means of exemplifying a practical application and embodiment of the essential features of my invention I herein set forth mainly its utilization in connection with the process of sugar refining, with the understanding that analogous uses are also involved.

For instance, in the prior state of the art of sugar refining with the use of carbon for decolorizing the sugar liquors, the carbon gradually deteriorates in its ash and color-absorbing qualities until it becomes what is known technically as a "discard", after which it is disposed of for conversion chiefly into phosphoric acid and calcium sulphate. In this "discard" char the pores have either become clogged, or their surfaces coated with an inactive "secondary" carbon. Attempts have been made to burn off this "secondary" carbon with air at a red heat, but this only weakens the structure or skeleton of the base, causing it to "break-down" and powder, without in any way reactivating the remaining carbon constituent. Other old methods which may be mentioned are, cleaning treatment with alkali and alkali earth, hydroxide, carbonates, sulphates, chlorides, and phosphates. Also with acids such as phosphoric, hydrochloric, sulphuric, hydrofluoric, etc., all without any reactivating effect.

In my new process the impurities which go to form this inactive carbon are first removed from the porous base by cleaning by means of sodium hydrate and hydrochloric acid, thus getting rid of organic impurities and free mineral matter in their uncarbonized condition, and the original active carbon, which by use has become inactive, is reactivated to a degree equal to its initial activity; and this process may be repeated continuously. On account of the extreme hardness of base thus attained, powdering by attrition is practically eliminated, and the little powder which may be formed, is overbalanced by the new deposition of pyro-bituminous-oxygenated-carbon.

In carrying out my process, the char, carbon, or other porous structural base, such as burnt-off bone, pumice stone, fuller's earth, coral, etc., is washed with warm water and dilute sodium hydrate to remove organic impurities present or from the liquids treated. The washed base is then heated in water, and 10% hydrochloric acid added until a slight permanent acidity is obtained. This acid treatment releases the foreign lime adsorbed from the sugar or other liquors, as well as all mineral ash, and after removing these solubilized salts with hot water, the now neutral char, carbon, or other base structure, is dried and fumed with oxygenated pyro-bituminous-gas at the rate of about one part by weight to one thousand parts of base material, char, carbon, etc. The treated material is then heated out of contact with air to deposit what I believe to be a new unsaturated oxygenated-carbon $(C_nO)$ and then cooled and used. After the carbon or other basic constituents loses its decolorizing activity, by adsorbing of impurities from the liquors treated, the process is repeated, and in this way even a discarded decolorizing material which has no further value as a purifying and decolorizing element is reactivated to such a degree as to equal the best new bone char or other base, it being restored to original state. When new bone char, or base is given this treatment, its activity is increased enormously.

As is well known:

Oxygen is a dyad $-\overset{2}{\underset{4}{O}}-$

Carbon is a tetrab $-\overset{}{\underset{}{O}}-$

Carbon monoxid $\overset{4\;2}{CO}$ is therefore an unsaturated gas, while

Carbon dioxid $\overset{4\;2}{CO_2}$ is a saturated gas.

$\overset{4\;2}{C_nO}$ is therefore an unsaturated solid, and the only known "solid unsaturated monoxid of carbon," or "carbon in solid state carrying oxygen."

As other means of getting oxygen gas, I may also use peroxide, perborates, permanganates, chlorates, metallic oxides, electrically produced oxygen, etc. In short, any substance which, whether heated or not, will evolve oxygen and communicate the same to the carbon, char, or other porous base to be treated.

In fact any atmosphere, or metallic, or nonmetallic element capable of supplying or evolving oxygen, in the cold or at elevated temperatures below 1000° C. and in neutral, alkaline or acid medium, with or without a reducing agent, which would in any of these ways communicate its gases to the carbon constituent, is to be regarded as being covered by this application. For example:

Potassium permanganate acts according to the following reactions, evolving 1, 3, and 5 atoms of oxygen per two molecules of the salt.

(A) No reducing agent present and alkaline medium.

$$4KMnO_4 + 4KOH = 4K_2MnO_4 + 2H_2O + (O_2 \text{ oxygen set free}).$$

(B) Reducing agent present, such as the carbon of the char neutral medium.

$$4KMnO_4 + 2H_2O = 4MnO_2 + 4KOH + (3O_2 \text{ oxygen set free}).$$

(C) In acid medium, with or without reducing agent.

$$4KMnO_2 + 6H_2SO_4 = 2K_2SO_4 + 4MnSO_4 + 6H_2O + (O_2 \text{ oxygen set free}).$$

(D) At elevated temperatures.

$$6KMnO_4 = 3K_2MnO_4 + 3MnO_2 + (3O_2 \text{ oxygen set free}).$$

An additional advantage is that any excess oxygen incidental for the production of this new oxygenated-carbon, goes to convert the calcium sulphide to sulphate—

$$CaS + 4O = CaSO_4.$$

This calcium sulphide is present in most used chars or carbons. It is produced by reduction of the sulphate in presence of the carbon, thus—

$$CaSO_4 + 4C = CaS + 4CO$$

and $$CaSO_4 + 3C = CaS + 2CO + CO_2.$$

The calcium sulphate finds its way to the char from the wash water or liquors to be treated such as raw sugars, as well as by the free lime in the char, it being converted to both sulphide and sulphate from the sulphur fumes in the burning fuel used to fire the kilns $$CaO + SO_2 + 2C = CaS + CO + CO_2.$$

Any calcium sulphide CaS, taken up from these outside sources is split up into carbon oxysulphide CO.S, a gas, carbon monoxid CO also a gas, and calcium oxid a solid alkaline earth, $$CaS + 3O + 2C = CO.S + CO + CaO.$$

This calcium sulphide tends to form yellow and brown tints in the finished products if not converted back to the sulphate state.

Thus in my process of preparing an absorbent base for decolorizing purposes, air, oxygen gas, or an oxygen-carrying or evolving material, is adsorbed on the microscopic capillaries of inorganic structures such as burnt-off lime phosphate, bones or bone ash, or organic structures, as for example recarbonized bones and carbon chars in general. In the presence of carbon or carbon-forming materials, the process produces a finely divided extremely hard and highly active oxygenated carbon structure which in my opinion is the compound $(C_nO)$ (carbon having active oxygen adsorbed on its surface) having an ash and color adsorbing capacity superior to all known decolorizing carbons.

By this process the carbon contains active oxygen adsorbed on its surface in a loosely combined but essentially integral unitary state, and an enormously increased surface area is attained and rendered available for the absorption and removal of the impurities from the liquors to be treated, such as raw sugars in their process of refining. The permeability and adsorptive capacity of the carbon or char for the liquors is also increased over previous methods, permitting free access of the liquor to the innumerable open canals and passageways of the capillaries. The walls of the pores or capillaries of this oxygen-carrying carbon have greater tenacity and elasticity (on account of combination with oxygen) and its susceptibility to temperature changes is practically nil, for the same reason, as it resembles vulcanite in its physical condition.

My pyro-bituminous distillate may be "cracked" to an oily gas by heating and mixed with oxygen or air, and this mechanical mixture adsorbed on char or burnt-off bone and then heated resulting, in my opinion in the $C_nO$ compound before mentioned. In this way the burnt-off bone is recoated with carbon, and in either case the oxygen is retained in its active state on the carbon surface. I have found that these burnt-off bones have a high specific capacity or selectivity for this carbon forming "oxygenated pyro-bituminous gas." This pyro-bituminous substance is the distillate from coal, coming over between the temperatures ranging from 315° C. to 450° C. It is of a waxy consistency, yellow to brown in color and leaves no coke in volatilization out of contact with air.

My oxygenizing gas may also be mixed with char, forming materials such as colloidal "gels", and jellies of raw sugar gums, an example of which is refinery defecation mud, and the whole dried and carbonized.

Ordinary bone char saturated with air or oxygen also produces this new oxygenized-carbon ($C_nO$). 60 litres of air or $\frac{2}{10}$ of 1 pound of potassium permanganate dissolved in 125 gallons cold water and this used as the last wash water will communicate its oxygen to the carbon and after washing out any soluble salts present, the char may be dried and used with or without heating, thus saving time and fuel. This demonstrated fact shows that the adsorbed oxygen gas produced the decolorizing and purifying results obtained, and that the oxygen is loosely combined on and with the carbon surface.

My new oxygenated-carbon plays a double role in that it is capable of absorbing and or adsorbing gases from the air, such as—chlorine, nitrogen, carbonic oxid, carbon monoxid, sulphurous acid, "tear-gas", etc., as well as for decolorizing sugar liquors, lactic acid, glycerine, aspirin, oils, etc. Furthermore my new product absorbs and or adsorbs gases other than oxygen in the cold, such as phosgene, mustard gas, etc., but gives them up on heating to redness below 1000° C.—oxygen being the only gas retained by the carbon or other base at elevated temperatures, under the conditions outlined herein.

What I claim as my invention and desire to secure by Letters Patent is,

1. The step in the process of producing an absorbent decolorizing medium, consisting in "cracking" a heavy distillate to attain a gas of lighter density, mixing the same with a limited amount of air, and absorbing the mixture in a porous carbon base.

2. The step in the process of producing an absorbent decolorizing medium, consisting in "cracking" a heavy distillate to attain a gas of lighter density, mixing the same with air, and absorbing the mixture in a porous carbon base, and heating in contact with a limited amount of air to retard combustion to a temperature ranging from 250° C. to 1000° C.

3. As an article of manufacture, an absorbent decolorizing medium comprising a porous carbon charged with an oily gas mixed with air and heated to a temperature ranging from 250° C. to 1000° C. in contact with a limited amount of air to retard combustion and to fix the oxygen.

4. As an article of manufacture, an absorbent filtrant comprising a porous carbon charged with an oily gas mixed with a limited amount of air and heated to a temperature ranging from 250° C. to 1000° C. in contact with a limited amount of air to prevent combustion and to fix the oxygen.

5. A step in the process of producing an absorbent decolorizing medium which consists in treating a porous carbon base with the fumes of a distillate "cracked" to an oily gas and mixing the same with a limited amount of air.

6. A step in the process of producing an absorbent decolorizing medium which consists in treating a porous carbon base with the fumes of a distillate "cracked" to an oily gas and mixing the same with a limited amount of air, and then heating same to a temperature of from 250° C. to 1000° C. out of contact with excess of air.

7. A step in the process of producing an absorbent decolorizing medium which consists in treating a gel of raw sugar gums with the fumes of a distillate "cracked" to an oily gas and mixing the same with a limited amount of air, and then heating same to a temperature of from 250° C. to 1000° C. out of contact with excess of air.

8. A step in the process of producing an absorbent decolorizing medium which consists in treating a gel partly volatile and capable of forming a porous base with the fumes of a distillate "cracked" to an oily gas and mixing the same with a limited amount of air, and then heating same to a temperature of from 250° C. to 1000° C. out of contact with excess of air, to form a porous base.

9. A step in the process of producing a decolorizing medium consisting in "cracking" a heavy oil to attain an oily gas of lighter density and at the same time charging it with a limited amount of air, and absorbing the mixture on a porous carbon base.

CHARLES B. DAVIS.